United States Patent [19]
Brown

[11] Patent Number: 5,156,112
[45] Date of Patent: Oct. 20, 1992

[54] SQUIRREL RESISTANT BIRD FEEDER

[76] Inventor: J. Edward Brown, 4297 Minmore Dr., Cincinnati, Ohio 45217

[21] Appl. No.: 755,626

[22] Filed: Sep. 5, 1991

[51] Int. Cl.⁵ .................. A01K 1/10; A01K 5/00; A01K 39/00
[52] U.S. Cl. .................................. 119/57.9; 119/57.8
[58] Field of Search .............. 119/57.9, 52.3, 53, 119/57.8

[56] References Cited

U.S. PATENT DOCUMENTS

| | | | |
|---|---|---|---|
| 3,780,703 | 12/1973 | Boehland, Jr. | 119/53 |
| 4,462,337 | 7/1984 | Kilham | 119/57.9 |
| 4,646,686 | 3/1987 | Furlani | 119/57.9 |
| 4,821,681 | 4/1989 | Tucker | 119/51 R |

*Primary Examiner*—Gene Mancene
*Assistant Examiner*—Cindy A. Cherichetti

[57] ABSTRACT

A bird feeder having a metal feed container located inside a concentric, coaxial, metal shroud cover that rotates. The metal prevents the feeder from being chewed into by undesirable animals, as well as prevents the birds from seeing the feed in the feeder, therefore the birds curiosity keeps them coming to the feeder to cause its rotation, therefore aiding in the rotation of the feeder cover to cause the feeder to cycle its open to feed mode to its closed no feed mode, allowing the feeder to feed intermittently, as the feeding windows of the cover become misaligned and back to alignment in their relationship to the orifices of the feed container, a cycling of the feed, no feed modes is attained. When the feeder is in its no feed mode, no animals can access the feed in the feeder, including the birds themselves, this is approximately one half of the time of a complete cycle. When the feeder is in its open to feed portion of the cycle which is approximately the other half of the time of a complete cycle, it will feed all birds large and small that are commonly fed at feeders. Should a squirrel or any animal as heavy as a squirrel or heavier attempt to feed, the cover shroud will move downward over the feed container, blocking access to the feed container. Type and size of feed to be fed, can attained with the seed selector band, by its location of placement on the feed container.

1 Claim, 2 Drawing Sheets

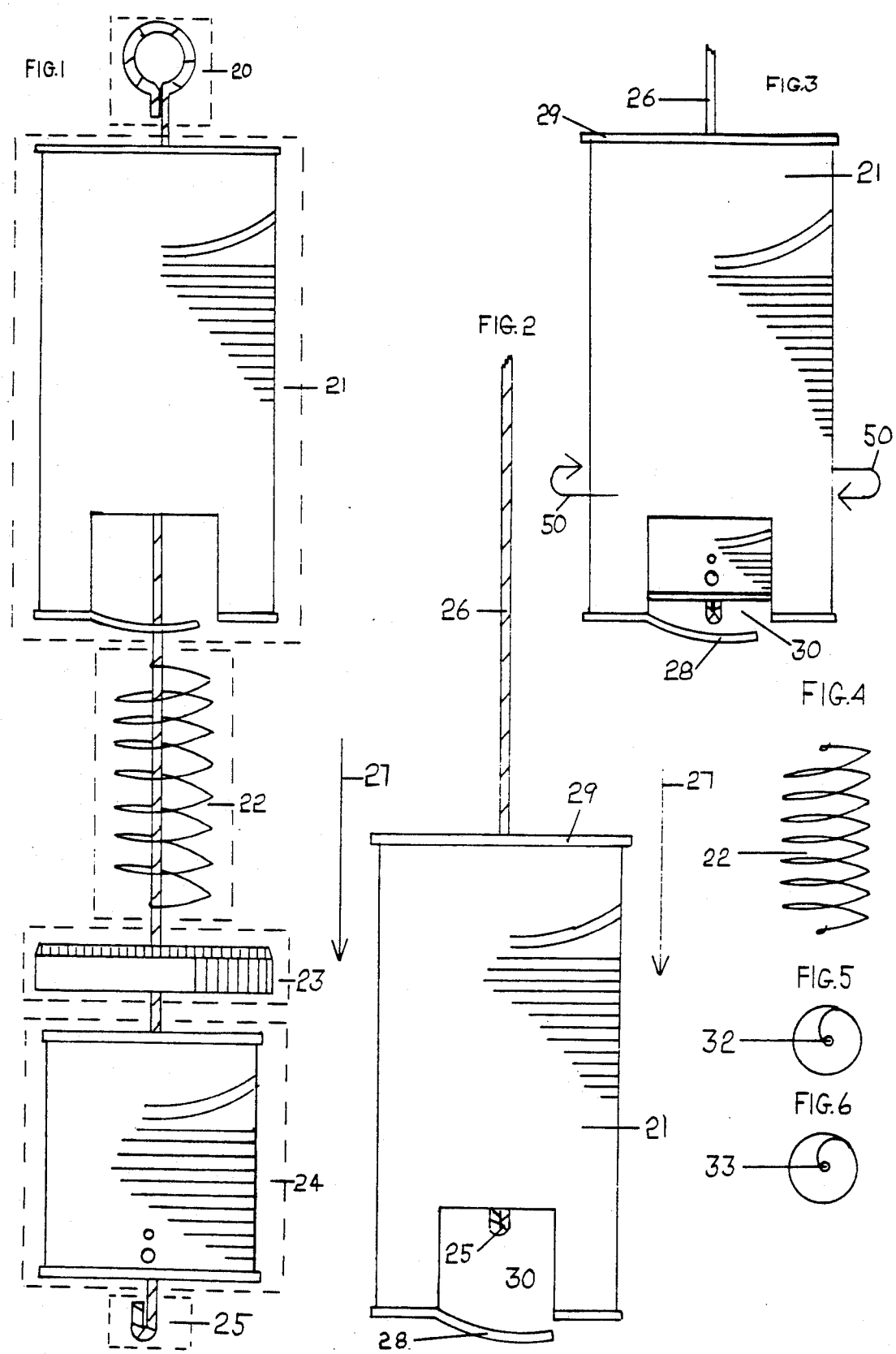

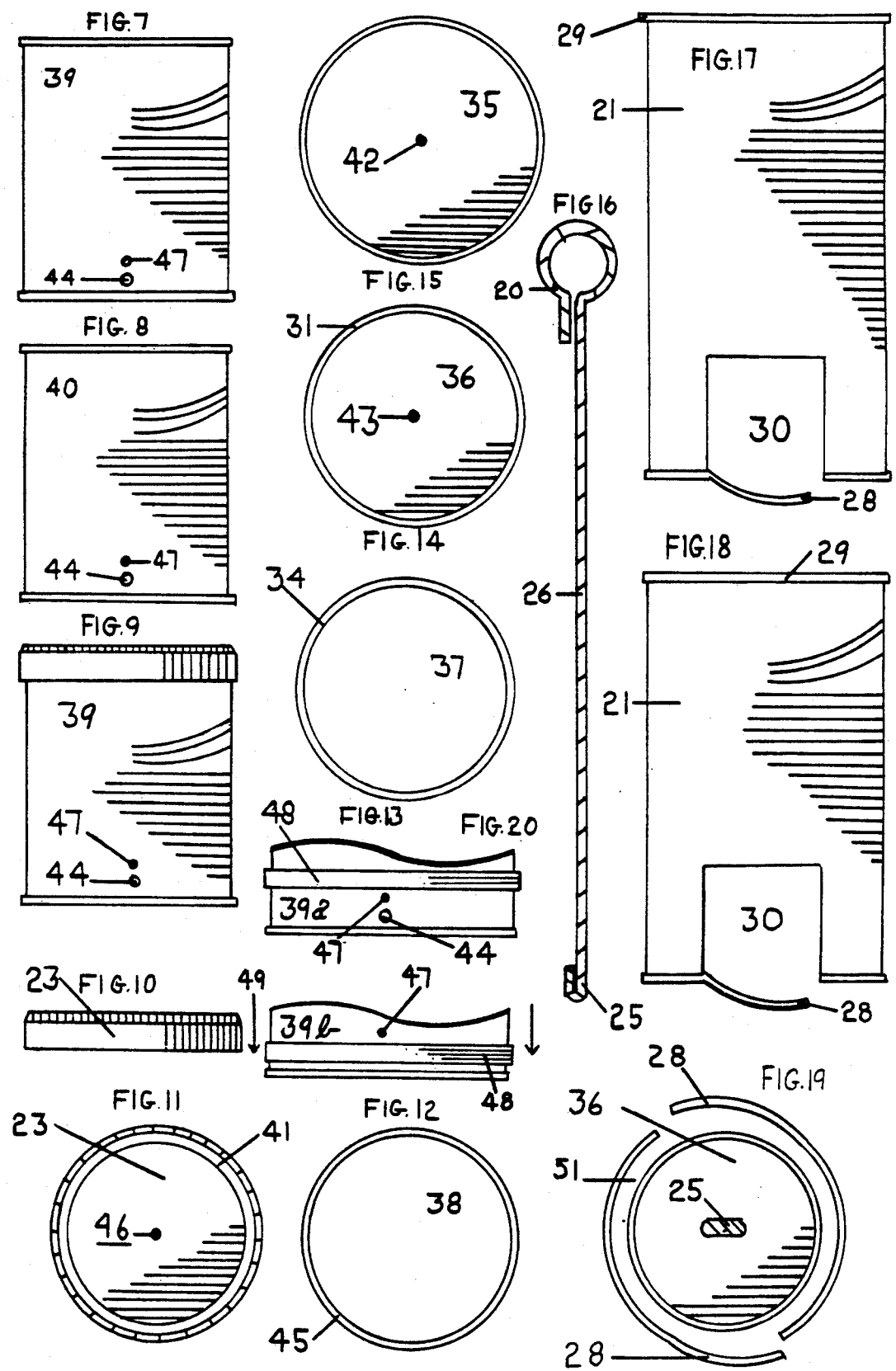

SQUIRREL RESISTANT BIRD FEEDER

BACKGROUND OF THE INVENTION

This invention relates generally to a bird feeder and, more particularly, to the type of feeder that will feed birds intermittently. The feeder will feed all sizes of commonly fed birds, large and small, exclude the feeding of squirrels, and allow for the choice as to type and size of feed, that is wished to be fed.

SUMMARY OF THE INVENTION

The general object of the invention is to provide a new and improved bird feeder that will limit the amount of feed fed to birds, and that requires the birds to search and exercise to attain feed from the feeder, so as to make the feeding more natural and healthier for the birds.

A still further object is to provide a feeder that allows for the type of feed to be fed, as to its size, therefore allowing user to vary the species of birds to be attracted to the feeder.

A final object is to provide a feeder that will allow for the feeding of all commonly fed birds, large and small, yet exclude animals that are the weight of a squirrel or larger.

THE PRIOR ART

When feeding birds, it is necessary to try and keep squirrels out and away from the bird feeder. Normally the bird feeder user is oblidged to chase squirrels with thrown objects, water spray, trying to place the feeder in an area that they think the squirrel does not have the ability to get to, and even going to the extreme of capturing the squirrels and taking them to another area. There is a need for a squirrel resistant bird feeder. Also for the general health of the birds, a constant food supply lessens their exercise in the searching of food. A user likes to vary the choice of seed in order to attract a certain species of the birds. There is a need for a bird feeder that is inexpensive, easy to use, excludes the feeding of squirrels, limits the amount of food to the birds user feeds, and gives the user the choice in seed selection for a certain species of birds that he wishes to feed. Other bird feeders have been proposed, such as trays, boxes, and vessels disclosed in U.S. Pat. Nos. 4,570,575, 4,102,308, 4,077,361, 3,960,112, 3,948,220, 3,917,128, 3,811,412, 3,788,279, U.S. Pat. Nos. Des. 303,168, 278,466, 278,166, 274,563, 273,429, 271,434, 269,300, 268,619, 266,611, 265,938, 252,162, 245,349, 290,414, 282,018, 280,559, 244,786, 244,098. The foregoing and other prior art bird feeders and containers do not present the design, squirrel resistiveness, intermittent feeding and seed choice and variance all in my bird feeder.

The above and other objects and features of the invention will be apparent to those skilled in the art to which this invention pertains from the following detailed description and the drawings.

BRIEF DESCRIPTION OF THE DRAWINGS

FIG. 1 is a view in front elevation exploded and bracketed of the preferred embodiment of my invention in squirrel resistant bird feeders;

FIG. 2 is a view in front elevation, partly in section of the bird feeder shown in FIG. 1 in its closed and shut off position.

FIG. 3 is a view in front elevation, partly in section, of the bird feeder shown in FIG. 1 in its open to feed position.

FIG. 4 is a view in front elevation of the coil spring shown in FIG. 1.

FIG. 5 is a top plan view of the coil spring shown in FIG. 1.

FIG. 6 is a bottom plan view of the coil spring shown in FIG. 1.

FIG. 7 is a view in front elevation of the seed container shown in FIG. 1.

FIG. 8 is a view in rear elevation of the seed container shown in FIG. 1.

FIG. 9 is a view in front elevation of the seed container with lid shown in FIG. 1.

FIG. 10 is a view in front elevation of lid shown in FIG. 1.

FIG. 11 is a top plan view of lid shown in FIG. 1.

FIG. 12 is a bottom plan view of lid shown in FIG. 1.

FIG. 13 is a top plan view of seed container shown in FIG.

FIG. 14 is a bottom plan view of seed container shown in FIG.

FIG. 15 is a top plan view of shroud shown in FIG. 1.

FIG. 16 is a view in front elevation of assembly cable shown in FIG. 1.

FIG. 17 is a view in front elevation of shroud shown in FIG. 1.

FIG. 18 is a view in rear elevation of shroud shown in FIG. 1.

FIG. 19 is a bottom plan view of shroud and seed container shown in FIG. 1.

FIG. 20 is a view in front elevation, partly in section, showing seed selector band in its large size seed feeding position, and also showing seed selector in its small size seed feeding position.

DESCRIPTION OF THE PREFERRED EMBODIMENT

FIG. 1 and FIG. 2 illustrate the preferred embodiment of this invention in squirrel resistant and intermittently feeding bird feeder, wherein it is generally indicated at FIG. 3. The feeder has a flexible steel wire cable 26, a seed container made from tin metal 24 that is cylindrical in shape, with an open top 37 and a closed bottom 36, that has a center hole in its bottom 43 that is slightly larger in diameter than the cable 26, it is approximately of one pint size. A lid 23 that has a top center hole 46, and is made of tin metal. A seed selector band 48, that is made of rubber. A soft metal coil spring 22. A shroud cover 21, that is cylindrical in shape and slightly larger in diameter than the seed container, and approximately twice the height of the seed container, it has an open bottom 51, and a closed top 35 that has a center hole 42, that is slightly larger in diameter than the cable 26, is made of tin metal and is approximately one quart in size. Cut from the wall of the shroud 21, at its open end, are two feeding windows 30 and the two perches 28, they are positioned directly opposite of each other.

When the user fills the seed container, with the feeder in its hanging position, they slide the shroud cover 21, up the cable, exposing the seed container, they then slide the spring 22 and the lid 23 up the cable, the flexible cable allows for tilting of the seed container for filling. With the seed container sitting on stop 25, they put lid back onto seed container and allow spring to drop down onto top of lid, sets seed selector band for selected type feed and let the cover slide down to its support on the spring. The feeding orifices in the feed container 44 and 47, will now be available through the feeding windows 30, in the shroud cover 21.

A weight of four ounces or more, when applied anywhere to the shroud cover, will cause the coil spring to disfigure, and allow the cover to move downward to cover the feeding orifices in the feed container, blocking the feeding by that particular animal. When this weight of four ounces or more is removed from the shroud cover, the spring will cause the cover to return to its up position allowing for feeding or non feeding, depending on the mode that the feeder is in.

When user desires to feed the large size seed, such as sunflower seed, user places seed selector 48, in position 39a as shown in FIG. 20, giving access to orifice 44, in seed container 24. User desires to feed the small size seed, such as thistle seed, they place seed selector band 48, over orifices 44, to give access to orifices 47 in the seed container 24.

The bird feeders feed and no feed modes will be attained for the user, as each time a bird flys off from the perch 28, the perch acts as a rudder, and are positioned so that the bird flys off in a given direction, therefore the shroud rotates slightly in a clockwise direction, shown in FIG. 3 at 50. As the perches 28, are both formed from the bottom rim of the shroud 21, and are both set with their free end out approximately 20 degrees from the wall of the shroud, and this positioning being the same for both perches, directs birds to fly off to their right, affecting a clockwise rotation action of the shroud cover. Through this rotating action, the windows of the shroud, continuously lose and regain their alignment to the orifices 44 and 47, giving an approximate half the time open to a half the time closed in its cycling time.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A non-selective bird feeder that allows for the feeding of all commonly fed birds, comprising:

a feed container adapted to be supported in a vertical position and having a cylindrical tubular side wall of circular cross section and uniform diameter throughout its length, said container further having an end wall closing the bottom of said side wall to support feed within said container, said side wall being open at its top for filling, with a closing lid that also serves for a surface bearing point for a spring, said container further having four seed access orifices in its sidewall near its base, said container further having a seed selector band to allow for the use of a particular size seed, a metal shroud cover adapted to be supported in a vertical position and having a tubular cylindrical side wall coaxially surrounding said container, said shroud having a circular cross section of a uniform diameter greater than said diameter of said sidewall, said shroud being connected to and supported on said spring by an assembly cable for linear vertical movement under the bias of said spring between an upper first position and a lower second position and also allowing for the horizontal rotating action under the bias of the force put against a perches from birds exiting said perches, a bird perch which is formed from the bottom rim of the shroud cover at an angle of approximately 20 degrees from the wall of the shroud, a feeding window cut from the sidewall of the shroud that allows for the alignment and mis-alignment of said window and said seed orifices of the said seed container to cause the cycle of feed to non-feed, and a spring that allows for the horizontal rotation of the shroud by its serving as a bearing between the shroud and said seed container.

* * * * *